United States Patent [19]

Lockshin

[11] 4,121,380
[45] Oct. 24, 1978

[54] LOUVERED WINDOW SHADE DEVICE

[76] Inventor: Robert E. Lockshin, 2025 NE. 154th St., North Miami Beach, Fla. 33162

[21] Appl. No.: 775,518

[22] Filed: Mar. 8, 1977

Related U.S. Application Data

[63] Continuation of Ser. No. 659,599, Feb. 20, 1976, abandoned.

[51] Int. Cl.² ............................................. E05C 7/02
[52] U.S. Cl. ................................... 49/67; 296/95 R
[58] Field of Search ..................... 49/67, 62, 61, 71; 296/95 R; 52/473; D12/181, 182

[56] References Cited

U.S. PATENT DOCUMENTS

| | | | |
|---|---|---|---|
| 2,210,624 | 8/1940 | Kramer | 49/62 |
| 2,264,014 | 11/1941 | Wohlfield | 296/95 R |
| 2,349,470 | 5/1944 | Stanfield | 49/62 |
| 2,497,419 | 2/1950 | Schwartz | 49/71 |
| 4,023,309 | 5/1977 | Backward | 49/62 |

OTHER PUBLICATIONS

"Chastains Shadow" Brochure for Rear Window Shade.

"Korky's Kustom Studios" Brochure for Rear Window Shades.

*Primary Examiner*—Philip C. Kannan

[57] ABSTRACT

A louvered window shade device for installation relative to the rear windows of automobiles, particularly of the body types commonly known as fast-backs, hatchbacks, etc., wherein substantially portions of the interior compartments thereof are normally exposed to the direct rays of the sun because of the acute angular relation of the windows to horizontal planes through the cars. A pair of elongated, angular mounting bars are force fitted between the outside surface of the rear window glass and the respective side lengths of the existing, resilient window trim strip. The upper ends of the mounting bars terminate in opposed, inwardly extending plates, similarly force fitted between the glass and the top portion of the trim strip, the main body portion of the louvered shade being hingedly connected at its upper end to the plates to provide for swinging movement thereof into and out of a covering relation to the rear window glass. A suitable latch device is provided to selectively maintain the main body portion of the louvered shade in a closed relation to the rear window.

8 Claims, 9 Drawing Figures

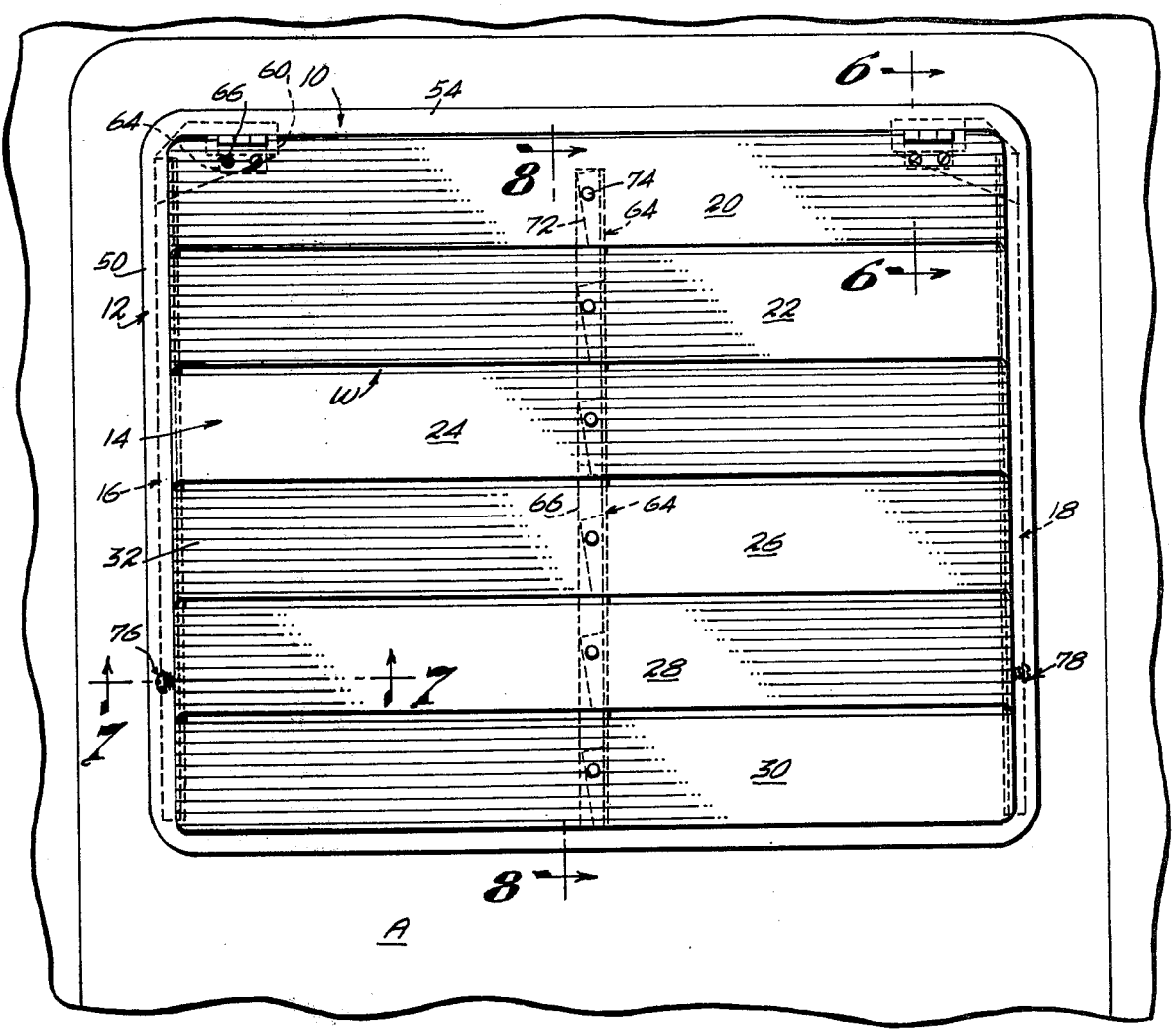

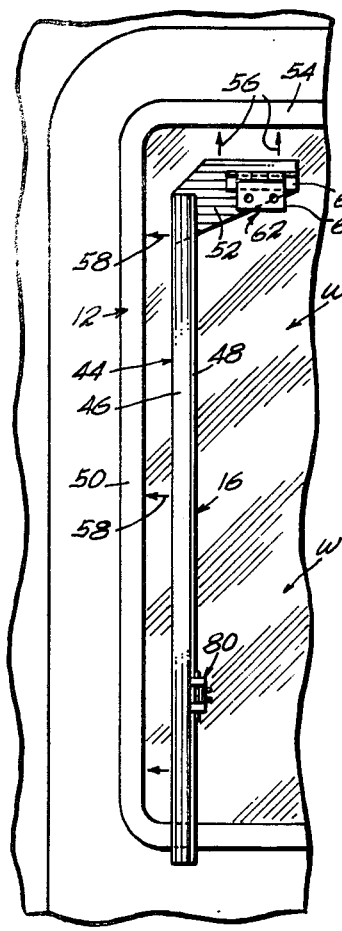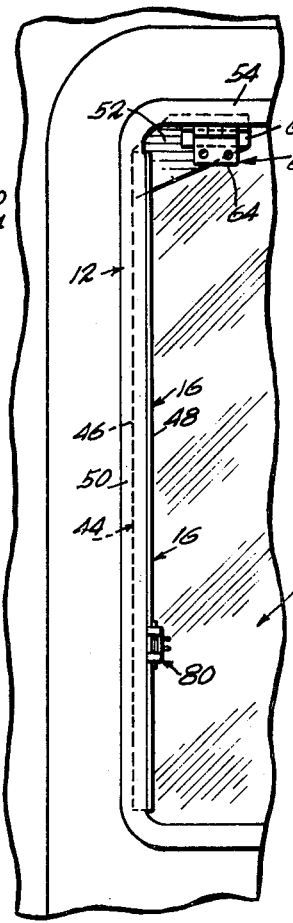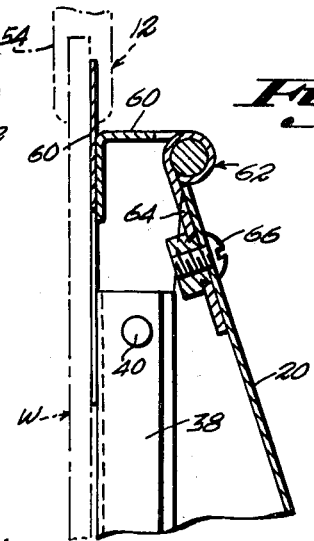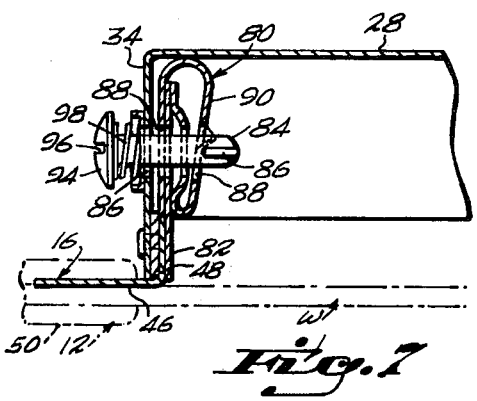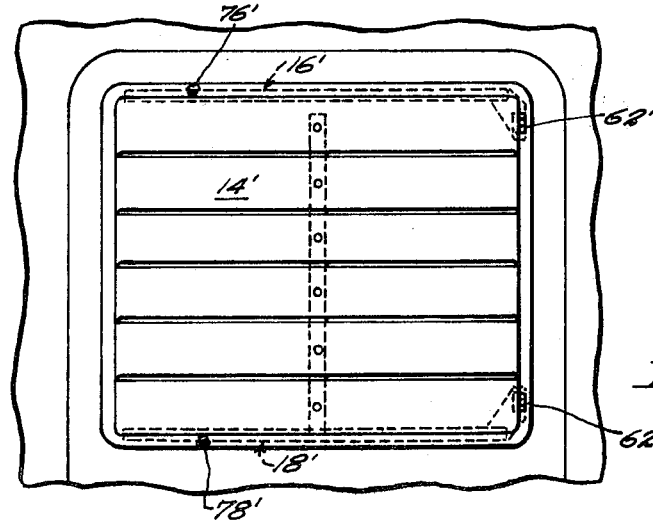

LOUVERED WINDOW SHADE DEVICE

REFERENCE TO CO-PENDING APPLICATION

This application is a continuation of Ser. No. 659,599, filed Feb. 20, 1976, now abandoned.

BACKGROUND OF THE PRESENT INVENTION

Louvered window shade devices for covering the rear windows of automobiles as conventionally employed generally require the drilling of holes through the body of a car to provide a hinged connection thereto. This, of course, is undesirable, however, it is essential to provide means to open the louvered shade to permit cleaning of the window.

The device of the present invention employs a pair of elongated, angular, mounting strips which are force fitted, respectively, between the outer surface of the rear window glass and the two side portions of the existing resilient window trim strip. Relatively short, oppositely, inwardly projecting plates, fixed to the top end portions of the respective mounting strips, are similarly force fitted under the upper end portions of the trim strip, and the main body portion of the louvered shade is hingedly connected to said plates.

Adjacent the lower end of the main body portion, a suitable lock or latch means is provided to simultaneously hold same in a closed relation to the rear window and to confine the angular mounting strips against accidental dislodgment from their positions between the glass and the resilient trim strip.

OBJECTS AND ADVANTAGES OF THE PRESENT INVENTION

One of the principal objects of the present invention is to provide a louvered window shade device for attachment relative to the rear window of an automobile without the necessity of drilling holes in or otherwise defacing the car body.

Another principal object of this invention is to provide a pair of mounting bars which are force fitted between the outer face of the rear window glass and the respective side portions of the existing window trim strip.

A still further object of the instant invention is to provide hinge means connecting between the mounting bars and the top edge portion of the main body portion of the louvered window shade to permit said main body portion to be swung between open and closed positions relative to the rear window, said hinge connection also serving to maintain the upper end portions of the mounting bars in place.

Yet another object of the present invention is to provide latch means to simultaneously maintain the main body portion of the louvered shade in a closed relation to the rear window and to maintain the louver end portions of the mounting bars in place.

BRIEF DESCRIPTION OF THE DRAWINGS

FIG. 1 is a top plan view of the louvered window shade device of the present invention, installed relative to the rear window of an automobile;

FIG. 2 is a side perspective view of the louvered shade installed as in FIG. 1;

FIG. 3 is a side elevational view of the main body portion of the louvered window shade with parts broken away to better illustrate the invention;

FIG. 4 is a fragmentary plan view of one side portion of the rear window of an automobile with one angle mounting bar of the present invention in a position about to be force fitted into position between the outer surface of the rear window glass and the existing window trim strip;

FIG. 5 is a view similar to FIG. 4 with the angle mounting bar in an installed position;

FIG. 6 is an enlarged cross sectional view taken along line 6—6 of FIG. 1;

FIG. 7 is an enlarged cross sectional view taken along line 7—7 of FIG. 1;

FIG. 8 is a cross sectional view taken along line 8—8 of FIG. 1; and

FIG. 9 is a top plan view, similar to FIG. 1, of a modified form of the present invention;

DETAILED DESCRIPTION OF THE DRAWINGS

With reference to the drawings in which like reference characters designate like or corresponding parts throughout the various views, and with particular reference to FIGS. 1 and 2, the louvered window shade device, indicated generally at 10, is illustrated fixed in a closed relation to the rear window W of an automobile A. The rear window W is mounted in a conventional manner, surrounded by a resilient trim strip 12.

The louvered window shade device 10 includes a main body assembly 14 and a pair of side, angular, mounting bar assemblies 16 and 18. Main body assembly 14 is comprised of a plurality of louvers such as 20, 22, 24, 26, 28 and 30. Each louver includes a top wall 32 and generally truncated, triangular downwardly turned, opposed end walls 34 and 36. As best illustrated in FIG. 3, the lower edges of the end walls 34 and 36 of louvers 20 through 30 are aligned and interconnected by respective tie bars such as 38, by rivets 40. In this manner, the plurality of louvers 20 through 30 are held in a rigid, generally rectangular assembly.

As is generally conventional with louvered window shades of this nature, the angles of the end walls 34 and 36 and the acute angle of the rear window W are correlated to provide a minimum of obstruction to the driver's view through the rear window W via the open trailing end 42 of each louver. The top louver walls 32 will all be positioned in generally horizontal, parallel planes.

Mounting means for the main body assembly 14 comprises the pair of angular mounting bars 16 and 18. With reference to FIGS. 4 and 5, the mounting bar assembly 16 will be described in detail. It is comprised of an elongated angle member 44 providing an outwardly extending web 46 and an upstanding web 48 which extend substantially along the length of the one side 50 of the resilient trim strip 12. A plate 52, fixed as by spot welding to the upper end portion of angle member 44, is angled inwardly along an end portion of the top run 54 of trim strip 12.

As indicated by arrows 56, the plate 52 is moved upwardly, and force fitted between the outer surface of rear window W and one end portion of the top run 54 of trim strip 12. The mounting angle web 46 is then moved outwardly, indicated by arrows 58, and similarly force fitted under the side run 50 of trim strip 12, whereupon, the mounting bar assembly 16 will be captivated in the position illustrated in FIG. 5.

A short angle segment 60, forming a portion of a hinge assembly 62, is fixed as by spot welding along the outer face of plate 52. A pivotal leaf 64 of hinge assembly 62 is fixed by screws 66 to one side of the upper edge portion of the top louver 20.

The other side mounting bar assembly 18 and its hinged attachment to the opposite side of the upper edge portion of top louver 20 is identical in all respects to the above description of mounting bar 16 and needs no further description.

A center brace 64, generally bisecting the length of the louvers 20 through 30, includes an elongated foot web 66, carrying a strip of a resilient material 68, fixed along its lower surface, an upstanding web segment 70, extending upwardly to each louver 20 through 30 and top angle segments 72 fixed against the underside of each louver by rivets 74.

With particular reference to FIGS. 1 and 7, identical latch devices 76 and 78, preferably positioned along the opposed louver edge portions of the device, serve to lock the main body portion 14 to the respective angular mounting bars 16 and 18. These latches may be any of a variety of commercially available types, one of which is generally detailed in FIG. 7. A spring type keeper device 80 is spot welded to a finger 82 which is in turn spot welded to the upstanding web 48 of a mounting bar such as 16. A latch pin 84 extends through respective holes 86 and 88 in one side louver wall such as 34 and the spring keeper 80. The inner end of latch pin 84 is provided with a pair of oppositely extending wings 86 (one shown) which are adapted to pass through a slot 88 in the inner portion 90 of spring keeper 80 in one position only. When the wings 86 are passed therethrough and the pin 84 is rotated through 45°, for example, the main body portion 14 is locked to the mounting bar 16 as illustrated. Latch pin 84 is provided with an outer head portion 94 which is preferably slotted at 96 for the reception of a suitable tool and is spring-loaded at 98. When the latch pin 84 is actuated to align the wings 86 with slot 88, the spring 98 automatically unlatches the main body portion 14 from the mounting bar 16 for pivotal movement about the top hinge connections 62.

It should be noted that the top hinge connection previously described, and the locked engagement of the latch devices 76 and 78 secure the mounting bars 16 and 18 in place between the outer surface of the rear window and the resilient trim strip 12.

The modified form of the invention illustrated in FIG. 9 is identical with the preferred form as above described with the exception that the louvered main body portion 14' is hinged at 62' to the mounting bar assemblies 16' and 18' along a first side edge of the rear window; said mounting bars 16' and 18' being mounted, respectively, along the top and bottom edges of the rear window. Latch devices 76' and 78' are disposed along the top and bottom window edges adjacent the second side edge thereof.

As illustrated in the drawings, the louvered screen device is substantially rectangular in configuration. However, it should be understood that this configuration can vary to conform with the configurations of the rear windows of various automobile makes and models, for example, the width of the upper and lower edges may vary somewhat resulting in the corner angles being more or less than 90°.

What is claimed is:

1. A louvered window shade device for mounting relative to the rear window of an automobile comprising:
   a main body assembly comprised of a plurality of interconnected, horizontally disposed louvers, each louver including an elongated, transverse top wall and a pair of opposed end walls;
   mounting means including means for frictional engagement between the outside surface of the rear window and an existing, resilient trim strip, conventionally disposed about the periphery of the window;
   said mounting means comprising a pair of mounting bar assemblies, each including an elongated angle bar providing a first, outwardly extending web for frictional engagement between the outer surface of the rear window and one side run of the resilient trim strip, and a second, upstanding web;
   an inwardly angled plate fixed to the top end portion of each of said elongated angle bars for frictional engagement between the outer face of the rear window and the end portion of a top run of the resilient trim strip;
   hinge means interconnecting one edge portion of said main body assembly to said mounting means to permit said main body assembly to be pivoted between open and closed positions relative to the rear window;
   latch means connecting between said main body assembly and mounting means.

2. The device as defined in claim 1 wherein said hinge means comprises one hinge connection between each of said inwardly angled plates and the top edge portion of said main body assembly.

3. The device as defined in claim 2 wherein said latch means comprises one manually actuated latch connecting between each side of said main body assembly and an upstanding web of one of said angle bars for selective operation between a latched position to lock said main body assembly in a closed relation to the rear window, and an unlatched position to permit said main body assembly to be pivoted about said hinge connections to an open position relative to the rear window.

4. The device as defined in claim 1 wherein said plurality of louvers are interconnected by a tie bar, fixed as by rivets along the lower edge portions of the aligned side walls on each side of said louvers.

5. The device as defined in claim 4 including a center brace member, fixed as by rivets to each of said louvers, intermediate said side walls.

6. A louvered window shade device for mounting relative to the rear window of an automobile comprising:
   a main body assembly comprised of a plurality of interconnected, horizontally disposed louvers, each louver including an elongated, transverse top wall and a pair of opposed end walls;
   mounting means including means for frictional engagement between the outside surface of the rear window and an existing resilient trim strip, conventionally disposed about the periphery of the window;
   said mounting means comprising a pair of mounting bar assemblies, each bar assembly including an elongated bar means having a top portion and said bar means each including a first outwardly-extending means for frictional engagement between the outer surface of the rear window and one side run of the resilient trim strip, and a second upstanding means;

hinge means interconnecting one edge portion of said main body assembly to said mounting means to permit said main body assembly to be pivoted between open and closed positions relative to the rear window;

latch means connecting between said main body assembly and mounting means; and each of said elongated bar means including an inwardly-angled plate fixed to the respective top edge portion for frictional engagement between the outer face of the rear window and the end portion of the top run of the resilient trim strip.

7. The device as defined in claim 6 wherein said means comprises one hinge connection between an inwardly angled plate projection from like end portions of each of said angle bar assemblies and one side of said main housing assembly, said plate projections being frictionally engaged between the outer surface of the rear window and opposed end portions of one side run of the resilient trim strip.

8. The device as defined in claim 7 wherein said latch means comprises a pair of manually actuated latches connecting between said main body assembly and the respective upstanding webs of said pair of elongated angle bar assemblies for selective operation between latched and unlatched positions.

* * * * *